UNITED STATES PATENT OFFICE.

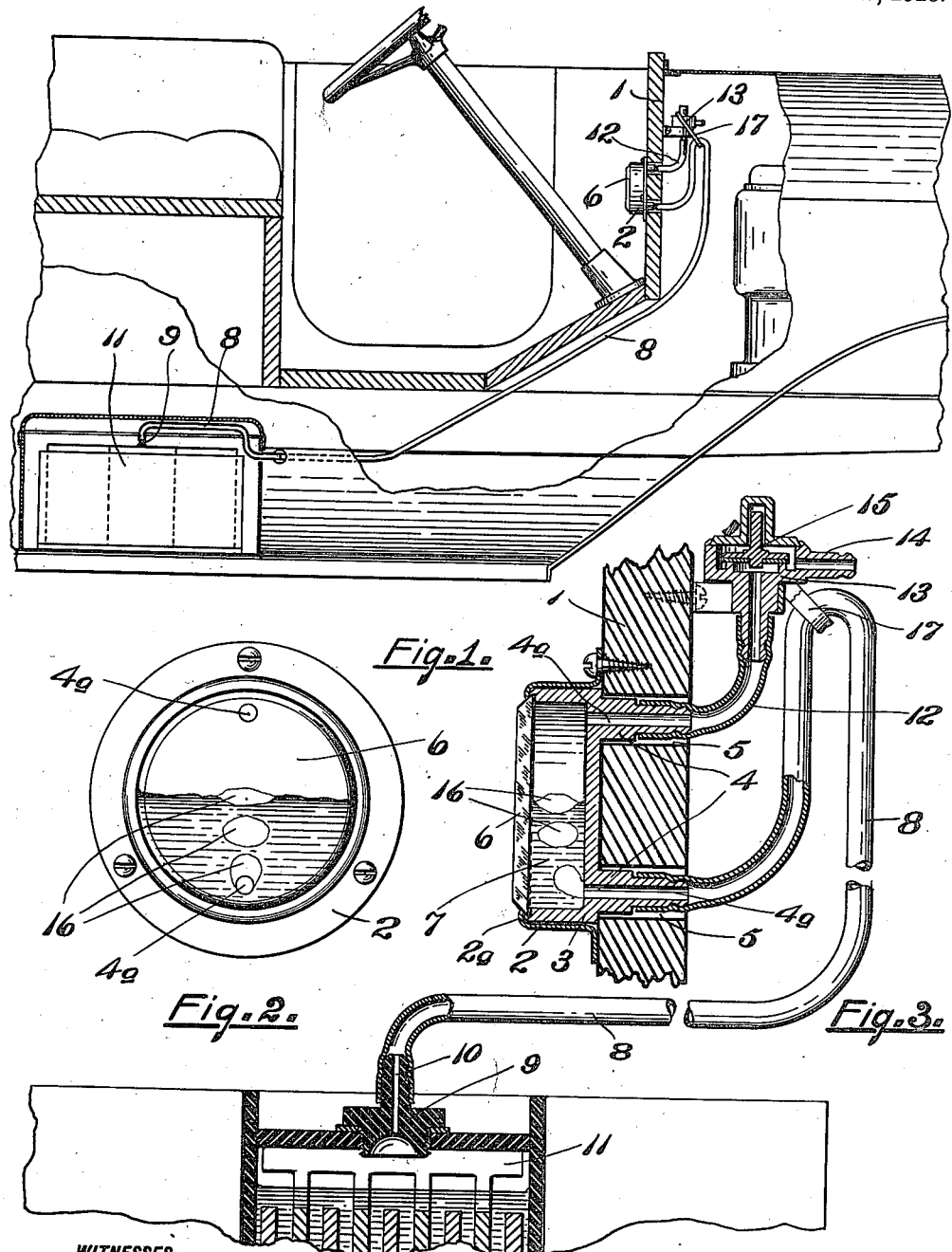

KARSTEN KNUDSEN, OF GRAND RAPIDS, MICHIGAN.

STORAGE-BATTERY INDICATOR.

1,172,890.  Specification of Letters Patent.  Patented Feb. 22, 1916.

Application filed July 31, 1914. Serial No. 854,357.

*To all whom it may concern:*

Be it known that I, KARSTEN KNUDSEN, a citizen of the United States of America, residing at Grand Rapids, in the county of Kent and State of Michigan, have invented certain new and useful Improvements in Storage-Battery Indicators; and I do hereby declare the following to be a full, clear, and exact description of the invention, such as will enable others skilled in the art to which it appertains to make and use the same.

This invention relates to an indicator for storage batteries, by means of which the condition of a battery relative to its being fully charged may be determined.

It is the object and purpose of this invention to make an indicator of this character of very simple construction and one which the ordinary person unexperienced in electrical mechanism may readily understand and use.

In storage batteries of the ordinary type, as the battery becomes fully charged, gas is given off therefrom, this gas during the charging of the battery and before the thorough desulfation thereof has been accomplished, being absorbed in the chemical reactions which take place in the battery. But as the battery becomes fully charged such chemical reactions come to an end. The gases resulting from the further supply of electrical current to the battery and the electrolysis of the liquid therein pass from the battery to the outside atmosphere. I have made use of this well known condition in the working of my indicator and therefrom anyone may readily determine whether or not their battery has been or is fully charged. The construction by which this result is obtained is illustrated in the accompanying drawing in which, Figure 1 is a sectional and partial side view of an automobile showing the indicator as applied to the dash thereof. Fig. 2 is a front elevation of said indicator; and Fig. 3 is a sectional view through portions of the battery and indicator mechanism showing the interior construction thereof.

Like reference characters refer to like parts throughout the several views of the drawing.

This indicator will be used especially in connection with automobiles and may be applied to the dash 1 thereof, there being secured to said dash a metal casing 2 in the form of a short cylinder having both ends open but with one end turned inwardly partially to form the lip 2ª which serves as a retaining means for the cup-like member 3 open at one end and having integral therewith, an upper outlet and a lower inlet stem 4, said stems extending to the rear and through openings 5 made in the dash. The cup 3 is closed at its open side by a glass closure 6 circular in outline and behind which a liquid 7 is retained partially filling the receptacle made by the cup member and its closure. The stems 4 are each bored making passageways 4ª therein. To the lower of said stems a tubular conduit 8 is attached, said conduit leading to a plug 9 which has a passageway 10 therethrough communicating with the interior of the storage cell 11 as fully indicated in Fig. 3. The upper of said stems 4 has also attached therewith a short tubular conduit 12 which at its other end is secured to a downwardly extending stem of the check valve 13, said valve having a stem 14 with an opening therein communicating with the tube 12 and also with the outside atmosphere so that any gases which may pass through tube 12 and through the check valve may be discharged to the outer atmosphere. The valve contains the usual movable valve member 15 which operates to permit the passing of gases from the tube 12 through the stem 14 but which will automatically close to prevent the entrance of air through the stem 14 into the tube 12.

From this construction it will be seen that when the battery is fully charged and the gases are given off therefrom they will pass through the plug 9, conduit 8 and the lower stem 4 into the liquid 7 and will rise in said liquid in the form of bubbles 16 passing thence outwardly through the upper stem 4, conduit 12 and the check valve 13. By observing the said indicator and noting whether or not said bubbles appear it will be clear whether or not the battery has reached its fully charged condition. After the battery has become used and a part of its charge exhausted, there is created a partial vacuum therein, the tendency of which would be, if the check valve 13 was not used, to draw the liquid 7 into the said battery. The check valve however, serves as a preventive to this undesired result. The conduit 8 is a flexible tubing and I have shown it supported by means of a band 17 extending around the check valve 13 and said conduit.

It will be clear that in an automobile the only part of the construction appearing to the operator thereof will be that on the dash consisting of the metal casing 2 and the glass front 6 through which appears the liquid 7, and if the battery is fully charged, the rising bubbles 16. All that is required to indicate if the battery is or has been fully charged is the presence of the rising bubbles and it is not necessary that anyone, for the understanding of this indicator, shall know anything whatever about the principles of electricity, the units of measurement thereof, or anything whatever about the construction, use or operation of secondary batteries or storage cells. The device is very simple in construction and can be very cheaply manufactured.

Various modifications in detail may be resorted to without departing from my invention. The construction shown, while of a practically operative form, is to be taken as diagrammatic and illustrative of the invention and not in any sense as limiting it to any precise construction other than is called for by the terms of the appended claims which define the invention.

I claim:

1. In an automobile, a dash, a receptacle having a transparent front member secured to the dash in position for observation, inlet and outlet stems extending from said receptacle through the dash, a liquid partially filling the receptacle and covering the inlet, a conduit tube attached to each stem, a check valve attached to the opposite side of the dash and having connected thereto the conduit tube leading from the outlet, a storage battery, and a perforated plug fastened in a side thereof, the conduit attached to the inlet stem being attached to said plug, substantially as described.

2. In an automobile, a dash, a receptacle having a transparent side secured to the dash in position for observation, inlet and outlet stems extending from said receptacle, a liquid partially filling the receptacle, and covering the inlet, a storage battery, a perforated plug fastened in the side thereof, and a conduit interposed between the inlet stem and said plug and attached thereto, substantially as described.

In testimony whereof I affix my signature in presence of two witnesses.

KARSTEN KNUDSEN.

Witnesses:
 FRANK E. LIVERANCE, Jr.,
 HOWARD H. YARRINGTON.